United States Patent

Matsumura et al.

[11] Patent Number: 6,093,240
[45] Date of Patent: *Jul. 25, 2000

[54] BINDER COMPOSITION AND AQUEOUS COATING COMPOSITION

[75] Inventors: Kazuyuki Matsumura; Masanao Kamei; Mitsuo Asai; Masaaki Yamaya; Fujio Yagihashi, all of Gunma-ken, Japan

[73] Assignee: Shin-Etsu Chemical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/896,175

[22] Filed: Jul. 17, 1997

[30] Foreign Application Priority Data

Jul. 18, 1996 [JP] Japan .................................. 8-207871
Mar. 21, 1997 [JP] Japan .................................. 9-087521

[51] Int. Cl.$^7$ ................................................ C09D 183/08
[52] U.S. Cl. ...................................... 106/287.11; 524/838
[58] Field of Search ........................ 106/287.11; 524/838

[56] References Cited

U.S. PATENT DOCUMENTS

| | | | |
|---|---|---|---|
| 4,277,284 | 7/1981 | Ginsberg et al. .................... | 106/1.05 |
| 4,395,461 | 7/1983 | Ching ................................... | 428/412 |
| 4,559,271 | 12/1985 | Doin et al. ............................ | 428/412 |
| 4,604,443 | 8/1986 | Chang et al. ......................... | 528/28 |
| 5,051,129 | 9/1991 | Cuthbert et al. ..................... | 106/2 |
| 5,116,472 | 5/1992 | Wolter et al. ........................ | 204/181 |
| 5,182,143 | 1/1993 | Holmes-Farley et al. ........... | 427/409 |
| 5,363,994 | 11/1994 | Angeline ............................... | 222/529 |
| 5,531,923 | 7/1996 | Le Blanc et al. ................... | 252/182.14 |
| 5,728,203 | 3/1998 | Vorse et al. ........................ | 106/287.11 |
| 5,840,428 | 11/1998 | Blizzard et al. ..................... | 428/412 |

FOREIGN PATENT DOCUMENTS

| | | |
|---|---|---|
| 462 032 | 12/1991 | European Pat. Off. . |
| 691 373 | 1/1996 | European Pat. Off. . |
| 6279678 | 4/1994 | Japan . |
| 7291667 | 7/1995 | Japan . |
| 2 284 609 | 6/1995 | United Kingdom . |

*Primary Examiner*—Margaret G. Moore
*Attorney, Agent, or Firm*—Millen, White, Zelano, & Branigan, P.C.

[57] ABSTRACT

An organic silicon compound is obtained by hydrolyzing (A) a hydrolyzable silane containing an alkoxy or acyloxy group and a nitrogenous organic group: and (B) a hydrolyzable silane containing an alkoxy or acyloxy group. The hydrolyzate or organic licon compound is available as an aqueous solution which is ready for use as a binder composition. An aqueous coating composition comprising the binder composition and optionally, a UV screen compound is also provided. The binder composition and the coating composition are shelf stable and impart water resistance, heat resistance and weatherability.

15 Claims, No Drawings

BINDER COMPOSITION AND AQUEOUS COATING COMPOSITION

BACKGROUND OF THE INVENTION

1. Field of the Invention

This invention relates to a binder composition and an aqueous coating composition comprising the binder composition as a binder component. More particularly, it relates to a binder composition which is added to an aqueous coating composition to impart water resistance, heat resistance and weather resistance and is stable even in an alkaline region.

2. Prior Art

In conjunction with the recent increasing public concern about environment protection, active research works have been made to substitute aqueous systems for solvent system paint and coating compositions. Aqueous systems have a number of benefits including safe operation and the elimination of the hazards of air pollution, explosion and fire evoked by the volatilization of solvents.

Additives are often added to such compositions for imparting water resistance, heat resistance and weatherability thereto. In order that additives be used in aqueous systems wherein water accounts for the majority of diluent, the additives must be soluble in water. Typical additives are silicone compounds and when used in solvent systems, they are effective for imparting water resistance, heat resistance and weatherability. However, few silicone compounds are stable in water and if any, they are just slightly stable under weakly acidic conditions and lose stability if the system turns alkaline.

As a solution to such problems, JP-A 279678/1994 proposes an aqueous surface treating composition comprising a major component obtained by reacting an aminotrialkoxysilane with an organic compound capable of reacting with the amino group, hydrolyzing the reaction product, and optionally further reacting the hydrolyzed product with an organometallic compound such as a tetraalkoxysilane. The major component, however, is less water soluble since the amino group which largely governs water solubility has been reacted with an organic group. To compensate for the loss of water solubility, an anionic surfactant is added to the treating composition as a stabilizer. When the composition is used as a binder, the inclusion of an anionic surfactant can exacerbate some properties such as water resistance and heat resistance. Additionally, the treating composition is not so stable over a long period of storage and is unstable in an alkaline region. For these reasons, the composition is not adequate as a binder.

On outdoor applications, silicone coatings on substrates do not prevent the substrate surface from being discolored or degraded in a substantial sense since silicone compounds as such cannot block or absorb sunlight.

U.S. Pat. No. 4,395,461 proposes to impart improved weatherability to a polycarbonate substrate by (1) treating a polycarbonate substrate with a solution of the hydrolysis product of a silylated organic UV screen and curing the applied hydrolyzate on the treated substrate and (2) applying a silicone hardcoat composition onto the treated polycarbonate substrate and thereafter heating the resulting composite until the applied hardcoat composition is cured. This method, however, uses an organic solvent and requires two layer coating. JP-A 291667/1996 discloses to impart weatherability and durability to a substrate by treating a substrate surface with a silicone primer coating solution containing a UV absorber and further forming a topcoat of a silicone hardcoat composition. This method also uses an organic solvent and requires two layer coating. Further, JP-A 279678/1994 discloses an alcohol/water base UV-resistant coating composition obtained by the hydrolysis of an alkoxysilane and a hydroxy group-containing organic UV absorber. The organic UV absorber in this composition is bonded through a SiOC linkage which is susceptible to hydrolysis and lacks durability.

SUMMARY OF THE INVENTION

An object of the present invention is to provide a binder composition which can effectively impart water resistance, weatherability and heat resistance to aqueous coating compositions and which is stable in an alkaline region.

Another object of the present invention is to provide an aqueous coating composition comprising the binder composition as a binder component and especially, such an aqueous coating composition further comprising a water-dispersible or soluble compound having a UV absorbing function so that the composition may form a UV screen.

We have found that a binder composition which is stable in an aqueous solution, especially in an alkaline aqueous solution and which can impart water resistance, heat resistance and weatherability to aqueous coating compositions is obtained simply by hydrolyzing a mixture of (A) 100 parts by weight of a nitrogenous organic group-containing hydrolyzable silane represented by the following formula (1) or a partial hydrolyzate thereof:

$$YR^1_m SiR^2_{3-m} \quad (1)$$

wherein $R^1$ is a substituted or unsubstituted monovalent hydrocarbon group having 1 to 8 carbon atoms, $R^2$ is an alkoxy or acyloxy group having 1 to 4 carbon atoms, Y is a nitrogenous organic group, and letter m is equal to 0 or 1 and (B) 5 to 200 parts by weight of a hydrolyzable silane represented by the following formula (2) or a partial hydrolyzate thereof:

$$R^3_n SiR^4_{4-n} \quad (2)$$

wherein $R^3$ is a substituted or unsubstituted monovalent hydrocarbon group having 1 to 8 carbon atoms, $R^4$ is an alkoxy or acyloxy group having 1 to 4 carbon atoms, and letter n is equal to 0, 1 or 2 in water or an organic solvent containing a sufficient amount of water for hydrolysis.

We have further found that an aqueous coating composition comprising the above-mentioned binder composition as a binder component, especially further comprising a compound having a ultraviolet absorbing function is free of the risks of toxicity and air pollution because it can be used in an aqueous system, and it is curable at room temperature and stable over a long period of storage. When a substrate is surface treated with the aqueous coating solution, there is formed a protective coating which can impart water resistance, heat resistance and weatherability to the substrate and prevent the substrate from being discolored and degraded upon exposure to UV radiation.

Accordingly, the present invention in a first aspect provides a binder composition comprising water and an organic silicon compound obtained by hydrolyzing (A) 100 parts by weight of a nitrogenous organic group-containing hydrolyzable silane of formula (1) or a partial hydrolyzate thereof and (B) 5 to 200 parts by weight of a hydrolyzable silane of formula (2) or a partial hydrolyzate thereof. In a second aspect, the invention provides an aqueous coating composition comprising the binder composition as a binder component and optionally, a water-dispersible or soluble compound having a ultraviolet absorbing function. Also contemplated herein is an article having a coating of the aqueous coating composition formed on its surface.

DESCRIPTION OF THE PREFERRED EMBODIMENT

According to the invention, the binder composition is defined as comprising an organic silicon compound dissolved in water. Component (A) which is used to produce the organic silicon compound is a nitrogenous organic group-containing hydrolyzable silane of formula (1). This component is used to render the system water soluble. One or more members may be selected from such silanes so as to impart water solubility to the organic silicon compound. A partial hydrolyzate of the silane is also useful.

$$YR^1{}_m SiR^2{}_{3-m} \tag{1}$$

In formula (1), $R^1$ is a substituted or unsubstituted monovalent hydrocarbon group having 1 to 8 carbon atoms and free of a nitrogen atom, for example, alkyl, alkenyl, aryl and aralkyl groups, and substituted ones thereof wherein some or all of the hydrogen atoms are replaced by halogen atoms, preferably fluorine atoms. Illustrative examples include —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, —$C_6H_{13}$, —$CF_3$, —$CH_2CF_3$, —$CH_2CH_2CF_3$, —$CH_2CH_2CH_2CF_3$, —$CCl_3$, —$CHCl_2$, —$CH_2Cl$, —$CH_2CCl_3$, —$CH_2CH_2CCl_3$ and $CH(CCl_3)_2$.

$R^2$ is an alkoxy or acyloxy group having 1 to 4 carbon atoms, for example, —$OCH_3$, —$OCH_2CH_3$, —$OCH_2CH_2CH_3$, —$OCH(CH_3)_2$, —$OCH_2CH_2CH_2CH_3$, —$CH(CH_3)CH_2CH_3$, —$OCH_2CH(CH_3)CH_3$, —$OC(CH_3)_3$, —$OCOCH_3$, and —$OCOCH_2CH_3$ with the —$OCH_3$ and —$OC_2H_5$ being preferred.

Y is a nitrogenous organic group, for example, groups of the following formulae (3) to (6).

(3)

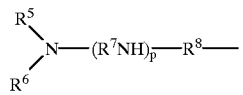
(4)

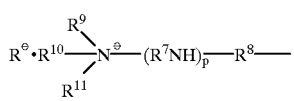
(5)

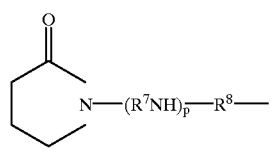
(6)

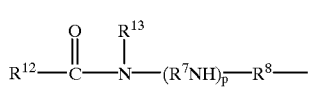

In the formulae, $R^5$, $R^6$, $R^9$ to $R^{13}$ each are hydrogen or a monovalent hydrocarbon group having 1 to 8 carbon atoms. $R^5$ and $R^6$; $R^9$, $R^{10}$ and $R^{11}$; and $R^{12}$ and $R^{13}$ may be identical with or different from each other. R is a halogen atom. Each of $R^7$ and $R^8$, which may be identical or different, is a divalent hydrocarbon group having 1 to 8 carbon atoms. Letter p is 0 or an integer of 1 to 3. The monovalent hydrocarbon groups of 1 to 8 carbon atoms are the same as described for $R^1$. The divalent hydrocarbon group of 1 to 8 carbon atoms are alkylene groups, for example.

Illustrative examples of Y are given below.
$H_2NCH_2$—, $H(CH_3)NCH_2$—, $H_2NCH_2CH_2$—, $H(CH_3)NCH_2CH_2$—, $H_2NCH_2CH_2CH_2$—, $H(CH_3)NCH_2CH_2CH_2$—, $(CH_3)_2NCH_2CH_2CH_2$—, $H_2NCH_2CH_2HCH_2CH_2CH_2$—, $H(CH_3)NCH_2CH_2HNCH_2CH_2CH_2$—, $(CH_3)_2NCH_2CH_2HNCH_2CH_2CH_2$—, $H_2NCH_2CH_2HNCH_2CH_2HNCH_2CH_2CH_2$—, $H(CH_3)NCH_2CH_2HNCH_2CH_2HNCH_2CH_2CH_2$—, $Cl^-(CH_3)_3N^+CH_2CH_2CH_2$—, $Cl^-(CH_3)_2(C_6H_5-CH_2-)N^+CH_2CH_2CH_2$,

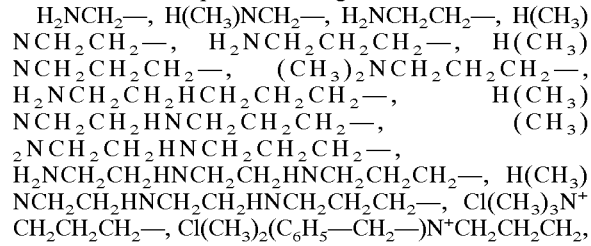

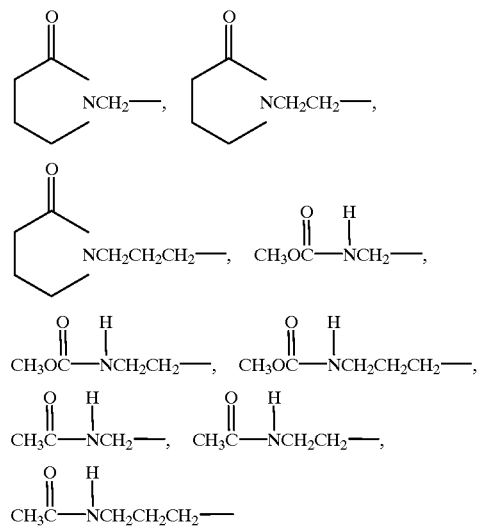

Among these, the following groups are preferred.

$H_2NCH_2CH_2HNCH_2CH_2CH_2$—,

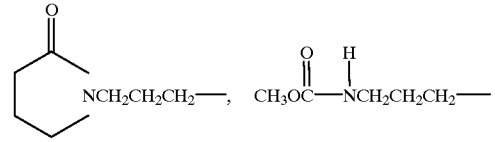

Letter m is equal to 0 or 1.

Illustrative examples of the nitrogenous organic group-containing hydrolyzable silane of formula (1) are given below.
$H_2NCH_2Si(OCH_3)_3$, $H_2NCH_2Si(OCH_2CH_3)_3$, $H_2NCH_2SiCH_3(OCH_3)_2$, $H_2NCH_2SiCH_3(OCH_2CH_3)_2$, $H_2NCH_2CH_2Si(OCH_{33}$, $H_2NCH_2CH_2Si(OCH_2CH_3)_3$.
$H_2NCH_2CH_2Si(OCH_2CH_3)_2$, $H_2NCH_2CH_2SiCH_3(OCH_2CH_3)_2$, $H_2NCH_2CH_2CH_2Si(OCH_2CH_3)_3$, $H_2NCH_2CH_2CH_2Si(OCH_2CH_3)_3$, $H_2NCH_2CH_2CH_2SiCH_3(OCH_3)_2$, $H_2NCH_2CH_2CH_2SiCH_3(OCH_2CH_3)_2$.
$H(CH_3)NCH_2CH_2CH_2Si(OCH_3)_3$, $H(CH_3)NCH_2CH_2CH_2Si(OCH_2CH_3)_3$, $H(CH_3)NCH_2CH_2SiCH_3(OCH_3)_2$, $H(CH_3)NCH_2CH_2CH_2SiCH_3(OCH_2CH_3)_2$,
$(CH_3)_2NCH_2CH_2CH_2Si(OCH_3)_3$, $(CH_3)_2NCH_2CH_2CH_2Si(OCH_2CH_3)_3$, $Cl^-(CH_3)_3N^+CH_2CH_2CH_2Si(OCH_3)_3$, $Cl^-(CH_3)_3N^+CH_2CH_2CH_2Si(OCH_2CH_3)_3$, $Cl^-(CH_3)_2(C_6H_5-CH_2-)N^+CH_2CH_2CH_2Si(OCH_3)_3$, $Cl^-(CH_3)_2(C_6H_5-CH_2-)N^+CH_2CH_2CH_2Si(OCH_2CH_3)_3$.

H$_2$NCH$_2$CH$_2$HNCH$_2$CH$_2$CH$_2$Si(OCH$_3$)$_3$,
H$_2$NCH$_2$CH$_2$HNCH$_2$CH$_2$CH$_2$Si(OCH$_2$CH$_3$)$_3$,
H$_2$NCH$_2$CH$_2$HNCH$_2$CH$_2$CH$_2$SiCH$_3$(OCH$_3$)$_2$,
H$_2$NCH$_2$CH$_2$HNCH$_2$CH$_2$CH$_2$SiCH$_3$(OCH$_2$CH$_3$)$_2$,
H$_2$NCH$_2$CH$_2$HNCH$_2$CH$_2$HNCH$_2$CH$_2$CH$_2$Si(OCH$_3$)$_3$,
H$_2$NCH$_2$CH$_2$HNCH$_2$CH$_2$HNCH$_2$CH$_2$CH$_2$Si(OCH$_2$CH$_3$)$_3$,
H$_2$NCH$_2$CH$_2$HNCH$_2$CH$_2$HNCH$_2$CH$_2$CH$_2$SiCH$_3$(OCH$_3$)$_2$,
H$_2$NCH$_2$CH$_2$HNCH$_2$CH$_2$HNCH$_2$CH$_2$CH$_2$SiCH$_3$(OCH$_2$CH$_3$)$_2$.

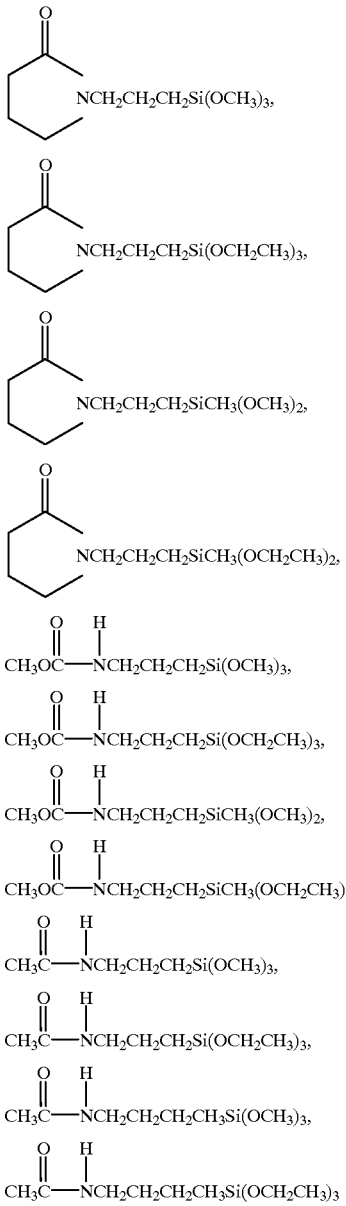

Preferred among these are H$_2$NCH$_2$CH$_2$HNCH$_2$CH$_2$CH$_2$Si(OCH$_3$)$_3$ and H$_2$NCH$_2$CH$_2$HNCH$_2$CH$_2$CH$_2$Si(OCH$_2$CH$_3$)$_3$. Partial hydrolyzates of the compounds are also useful.

Component (B) which is used in admixture with the hydrolyzable silane (A) or partial hydrolyzate thereof is a hydrolyzable silane (B) of the following formula (2). One or more members may be selected from such silanes. A partial hydrolyzate of the silane is also useful.

$$R^3{}_n SiR_{4-n} \qquad (2)$$

$R^3$ is a substituted or unsubstituted monovalent hydrocarbon group having 1 to 8 carbon atoms and free of a nitrogen atom, which is as defined for $R^1$, for example, alkyl, alkenyl, aryl and aralkyl groups, and substituted ones thereof wherein some or all of the hydrogen atoms are replaced by halogen atoms, preferably fluorine atoms. Illustrative examples include —CH$_3$, —CH$_2$CH$_3$, —CH$_2$CH$_2$cH$_3$, —CH(CH$_3$)$_2$, —CH$_2$CH$_2$CH$_2$CH$_3$, —CH(CH$_3$)CH$_2$CH$_3$, —CH$_2$CH(CH$_3$)CH$_3$, —C(CH$_3$)$_3$, —C$_6$H$_5$, —C$_6$H$_{13}$, —CF$_3$, —CH$_2$CF$_3$, —CH$_2$CH$_2$CF$_3$, —CH$_2$CH$_2$CH$_2$CF$_3$, —CCl$_3$, —CHCl$_2$, —CH$_2$Cl, —CH$_2$CCl$_3$, —CH$_2$CH$_2$CCl$_3$ and CH(CCl$_3$)$_2$.

$R^4$ is an alkoxy or acyloxy group having 1 to 4 carbon atoms, for example, —OCH$_3$, —OCH$_2$CH$_3$, —OCH$_2$CH$_2$CH$_3$, —OCH(CH$_3$)$_2$, —OCH$_2$CH$_2$CH$_2$CH$_3$, —CH(CH$_3$)CH$_2$CH$_3$, —OCH$_2$CH(CH$_3$)CH$_3$, —OC(CH$_3$)$_3$, —OCOCH$_3$, and —OCOCH$_2$CH$_3$, with the —OCH$_3$ and —OC$_2$H$_5$ being preferred.

Letter n is equal to 0, 1 or 2.

Illustrative examples of the hydrolyzable silane of formula (2) are given below.

Si(OCH$_3$)$_4$, Si(OCH$_2$CH$_3$)$_4$, Si(OCH$_2$CH$_2$CH$_3$)$_4$, Si(OCH$_2$CH$_2$CH$_2$CH$_3$)$_4$, CH$_3$Si(OCH$_3$)$_3$, CH$_3$Si(OCH$_2$CH$_3$)$_3$, CH$_3$Si(OCH$_2$CH$_2$CH$_3$)$_3$, CH$_3$Si(OCH$_2$CH$_2$CH$_2$CH$_3$)$_3$, (CH$_3$)$_2$Si(OCH$_3$)$_2$, (CH$_3$)$_2$Si(OCH$_2$CH$_3$)$_3$, (CH$_3$)$_2$Si(OCH$_2$CH$_2$CH$_3$)$_2$, (CH$_3$)$_2$Si(OCH$_2$CH$_2$CH$_2$CH$_3$)$_2$.

Preferred among these are Si(OCH$_3$)$_4$ and Si(OCH$_2$CH$_3$)$_4$ and partial hydrolyzates thereof.

Upon hydrolysis, 100 parts by weight of a nitrogenous organic group-containing hydrolyzable silane of formula (1) or a partial hydrolyzate thereof (A) is mixed with 5 to 200 parts by weight, preferably 10 to 150 parts by weight of a hydrolyzable silane of formula (2) or a partial hydrolyzate thereof (B). If the amount of silane (B) exceeds 200 parts, the resulting hydrolyzate becomes less stable in an alkaline region.

When a mixture of hydrolyzable silanes or partial hydrolyzates (A) and (B) is hydrolyzed in a solvent to produce an organic silicon compound which is a base of the binder composition of the invention, the solvent used is mainly water. If desired, organic solvents miscible with water such as alcohols, esters, ketones and glycols are added to water. Illustrative examples of the organic solvent include alcohols such as methyl alcohol, ethyl alcohol, 1-propyl alcohol, and 2-propyl alcohol; esters such as methyl acetate, ethyl acetate, and ethyl acetoacetate; ketones such as acetone and methyl ethyl ketone; and glycols such as glycerin and diethylene glycol.

The amount of the solvent used is preferably 400 to 5,000 parts by weight, more preferably 1,000 to 3,000 parts by weight per 100 parts by weight of the silane reactants. Less than 400 parts of the solvent would allow for excessive progress of reaction, resulting in a heterogeneous system which is less stable during storage. More than 5,000 parts of the solvent would be uneconomical.

Water is present in the solvent so as to give a molar ratio of water/silane reactants of 5/1 to 50/1. If this molar ratio is less than 5/1, hydrolysis would not fully proceed, sometimes exacerbating the stability of the system. A molar ratio in excess of 50/1 would be uneconomical.

Several reaction procedures can be employed. Method (1) is by adding dropwise a mixture of silanes to water or an organic solvent containing at least a necessary amount of water for hydrolysis. Method (2) is by adding dropwise water to a mixture of silanes in the presence or absence of an organic solvent. Method (3) is by first adding dropwise a hydrolyzable silane or partial hydrolyzate (B) to water or an organic solvent containing at least a necessary amount of water for hydrolysis and thereafter, adding dropwise a nitrogenous organic group-containing hydrolyzable silane or partial hydrolyzate (A) thereto. Method (4) is by first adding dropwise a nitrogenous organic group-containing hydrolyzable silane or partial hydrolyzate (A) to water or an organic solvent containing at least a necessary amount of water for hydrolysis and thereafter, adding dropwise a hydrolyzable silane or partial hydrolyzate (B) thereto. Method (1) is especially preferred because a more stable binder composition is obtained.

The hydrolyzate or organic silicon compound is obtained in the form of an aqueous solution. By adding or removing water, if necessary, a desired aqueous binder composition is formed wherein about 10 to about 2,000 parts, especially about 10 to about 1,000 parts by weight of water is present per 100 parts by weight of the organic silicon compound. If the amount of water is less than 10 parts by weight, the organic silicon compound itself would be less shelf stable. If the amount of water is more than 2,000 parts by weight, the binder composition must be added in a larger amount with an economical disadvantage.

Quite advantageously, the thus obtained aqueous binder composition is shelf stable and can be kept stable even when added as an additive to an aqueous coating composition in an alkaline region. Additionally, the binder composition can impart water resistance, heat resistance and weatherability.

The invention is also directed to an aqueous coating composition comprising the above-mentioned binder composition as a binder component. The coating composition preferably contains 100 to 5,000 parts by weight of water per 100 parts by weight of the water-soluble organic silicon compound.

The coating composition can be applied to a variety of articles to impart water resistance, heat resistance and weatherability thereto. The coating composition is thus useful as a paint composition. In this regard, a water-dispersible or soluble compound having a ultraviolet absorbing function is preferably added to the coating composition to convert it into a UV screen aqueous coating composition.

Any desired UV screen compound may be used as long as it is dispersible or soluble in water, capable of absorbing radiation in the wavelength range of shorter than 400 nm, and compatible with the organic silicon compound. For example, water-dispersible inorganic compounds having a UV absorbing function include microparticulate inorganic oxide sols containing at least one element selected from titanium, cerium, and zinc and microparticulate composite oxide sols, with titanium and cerium sols being preferred, especially those stable in an alkaline region. Such oxide particles coated with silica or the like are also useful from the standpoint of further increasing stability. Water-dispersible or water-soluble organic UV absorbing agent including benzophenone, benzotriazole, triazine and cyanoacrylate UV absorbing agents also can be used. For example, benzophenone compounds modified with sulfonic acid or sodium sulfonate such as 2-hydroxy-4-methoxybenzophenone-5-sulfonic acid and sodium salt of 2-hydroxy-4-methoxy-benzophenone-5-sulfonic acid, and water-dispersible condensates of benzotriazole compounds and polyethylene-glycol such as condensates of methyl-3-[3-t-butyl-5-(2H-benzotoriazole-2-yl)-4-hydroxyphenyl] propionate and polyethylene glycol may be used. Preferred water-dispersible organic compounds having a UV absorbing function include alkali metal salts (e.g., sodium salt) of 2-hydroxy-4-methoxybenzophenone-5-sulfonic acid.

Further useful UV screen compounds are acrylic copolymers containing a UV absorbing group, for example, water-soluble acrylic copolymers which are obtained by effecting radical copolymerization of a polymerizable vinyl monomer having a carboxyl group, a polymerizable vinyl monomer having a UV absorbing group, and another polymerizable vinyl monomer to produce a graft copolymer having an acid value of 100 to 400 KOH mg/g and reacting the graft copolymer with a base.

In the manufacture of water-soluble acrylic copolymers, the polymerizable vinyl monomer having a carboxyl group is exemplified by acrylic acid, methacrylic acid, crotonic acid, maleic acid, and fumaric acid and used in such an amount to give an acid value of 100 to 400 KOH mg/g, preferably about 10 to 50 parts by weight per 100 parts by weight of the entire polymerizable monomers. With an acid value of less than 100 KOH mg/g, the copolymers obtained after neutralization with a base would become water insoluble. With an acid value of more than 400 KOH mg/g, the copolymers would become too thick to work with. The polymerizable vinyl monomers having a UV absorbing group include benzophenone and benzotriazole compounds as shown below though not limited thereto.

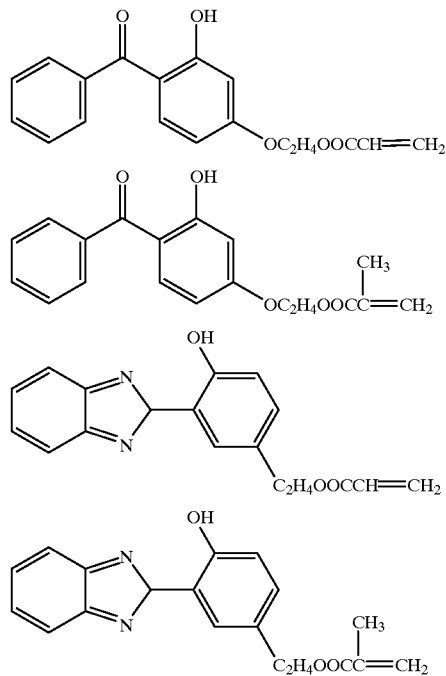

The polymerizable vinyl monomer having a UV absorbing group is preferably used in an amount of about 10 to 40 parts by weight per 100 parts by weight of the entire polymerizaple vinyl monomers. With more than 40 parts of the UV absorbing group-containing vinyl monomer, the copolymers obtained after neutralization with a base would become water insoluble. With less than 10 parts of the UV absorbing group-containing vinyl monomer, the copolymers would absorb less UV.

Examples of the other polymerizable vinyl monomer include (meth)acrylates such as methyl (meth)acrylate, ethyl (meth)acrylate, propyl (meth)acrylate, butyl (meth)acrylate, isobutyl (meth)acrylate, t-butyl (meth)acrylate, pentyl (meth)acrylate, hexyl (meth)acrylate, octyl (meth)acrylate, lauryl (meth)acrylate, stearyl (meth)acrylate, behenyl (meth) acrylate, phenyl (meth)acrylate, 2-hydroxyethyl (meth) acrylate, polyalkylene glycol (meth)acrylate, glycidyl (meth)acrylate, diethylaminoethyl (meth)acrylate, and perfluoroalkyl (meth)acrylate; aromatic compounds such as styrene and a-methylstyrene; and vinyl acetate, N-methylol (meth)acrylamide, and vinyl pyrrolidone. The other polymerizable vinyl monomer is preferably used in an amount of about 10 to 50 parts by weight per 100 parts by weight of the entire polymerizable vinyl monomers.

The radical polymerization to form the copolymer may be performed by well-known techniques as by using radical polymerization initiators. Solution polymerization using an organic solvent is preferred since the adjustment of a molecular weight is easy. The solvents used in solution polymerization include ketones such as acetone, methyl ketone, and methyl isobutyl ketone; esters such as ethyl acetate and butyl acetate; aromatic hydrocarbons such as benzene, xylene, and toluene; aliphatic hydrocarbons such as cyclohexane, hexane, and heptane; alcohols such as methanol, ethanol, isopropanol, methyl cellosolve, ethyl cellosolve, ethylene glycol, and propylene glycol; tetrahydrofuran, dioxane, and dimethylformamide. Since the organic solvent must be removed after neutralization with a base, water miscible low-boiling alcohols and acetone are preferred.

The radical polymerization initiators used herein include well-known ones, for example, peroxy ketals such as 2,2-bis(t-butylperoxy)octane, hydroperoxides such as cumenehydroxyperoxide, dialkylperoxides such as t-butylcumylperoxide, diacylperoxides such as benzoyl peroxide, and azo compounds such as 2,2-azobisisobutyronitrile. Chain transfer agents may be used for adjusting the molecular weight and viscosity. For example, mercaptoacetic acid, mercaptopropionic acid, 2-propanethiol, and 1-butanethiol are included.

Radical polymerization conditions include a temperature of about 50 to 150° C., preferably about 50 to 100° C. and a time of about 3 to 30 hours, preferably about 5 to 10 hours.

A base is added to the thus obtained copolymer solution to obtain a water-soluble polymer wherein some or all of the carboxyl groups are neutralized. Examples of the base used include alkali metal bases such as sodium hydroxide and potassium hydroxide; primary, secondary and tertiary amine compounds such as ammonia, triethylamine, tributylamine, diethylamine, and monoethanol amine; and heterocyclic compounds such as pyridine and piperidine. The base is used in an amount of at least 0.4 mol per mol of the carboxyl group because less amounts of the base are insufficient to render the copolymer water soluble.

The water-dispersible or soluble compound having a UV absorbing function is used in amounts of about 10 to 300 parts, preferably about 50 to 200 parts by weight per 100 parts by weight of the water-soluble organic silicon compound. Compositions with less than 10 parts of the UV screen compound are less UV absorptive whereas compositions with more than 300 parts of the UV screen compound would form coatings which are less resistant to water.

As previously mentioned, the amount of water blended in the coating composition is about 100 to 5,000 parts by weight, preferably about 500 to 2,000 parts by weight per 100 parts by weight of the organic silicon compound. Coating compositions with less than 100 parts of water would be less shelf stable whereas coating compositions with more than 5,000 parts of water would form thin coatings which are less resistant to heat.

If desired, antioxidants, antistatic agents, defoamers and leveling agents may be added to the coating composition according to the invention.

The coating composition may be applied by conventional techniques such as spraying, brush coating, roll coaters, and bar coaters.

Articles to be coated with the coating composition according to the invention include rubber, plastics (e.g., plastic parts and plastic film), metals, ceramics, glass, wood, paper and printed matter.

EXAMPLE

Examples of the invention are given below by way of illustration and not by way of limitation.

Synthesis Example 1

A 200-ml reactor equipped with a stirrer, thermometer and condenser was charged with 120 grams (6.67 mol) of water. With stirring at room temperature, a mixture of 44.4 grams (0.2 mol) of $H_2NCH_2CH_2HNCH_2CH_2CH_2Si(OCH_3)_3$ and 15.2 grams (0.1 mol) of $Si(OCH_3)_4$ was added dropwise over 10 minutes whereupon the internal temperature rose from 25° C. to 56° C. The reaction solution was further heated at 60 to 70° C. with an oil bath and stirred at the temperature for one hour. An ester adapter was attached to the reactor, which was heated to an internal temperature of 98° C. whereby the methanol by-product was removed. There was obtained 137 grams of an aqueous binder composition which had a nonvolatile content of 27.3% when heated at 105° C. for 3 hours.

Synthesis Example 2

A 200-ml reactor equipped with a stirrer, thermometer and condenser was charged with 120 grams (6.67 mol) of water. With stirring at room temperature, a mixture of 55.6 grams (0.25 mol) of $H_2NCH_2CH_2HNCH_2CH_2CH_2Si(OCH_3)_3$ and 7.6 grams (0.05 mol) of $Si(OCH_3)_4$ was added dropwise over 10 minutes whereupon the internal temperature rose from 27° C. to 51° C. The reaction solution was further heated at 60 to 70° C. with an oil bath and stirred at the temperature for one hour. An ester adapter was attached to the reactor, which was heated to an internal temperature of 98° C. whereby the methanol by-product was removed. There was obtained 132 grams of an aqueous binder composition which had a nonvolatile content of 31.1% when heated at 105° C. for 3 hours.

Synthesis Example 3

A 200-ml reactor equipped with a stirrer, thermometer and condenser was charged with 120 grams (6.67 mol) of water. With stirring at room temperature, a mixture of 33.3 grams (0.15 mol) of $H_2NCH_2CH_2HNCH_2CH_2CH_2Si(OCH_3)_3$ and 22.8 grams (0.15 mol) of $Si(OCH_3)_4$ was added dropwise over 10 minutes whereupon the internal temperature rose from 25° C. to 53° C. The reaction solution was further heated at 60 to 70° C. with an oil bath and stirred at the temperature for one hour. An ester adapter was attached to the reactor, which was heated to an internal temperature of 98° C. whereby the methanol by-product was removed. There was obtained 117 grams of an aqueous binder composition which had a nonvolatile content of 27.5% when heated at 105° C. for 3 hours.

Synthesis Example 4

A 200-ml reactor equipped with a stirrer, thermometer and condenser was charged with 120 grams (6.67 mol) of water.

With stirring at room temperature, a mixture of 53.1 grams (0.2 mol) of $H_2NCH_2CH_2HNCH_2CH_2HNCH_2CH_2CH_2Si(OCH_3)_3$ and 15.2 grams (0.1 mol) of $Si(OCH_3)_4$ was added dropwise over 10 minutes whereupon the internal temperature rose from 28° C. to 55° C. The reaction solution was further heated at 60 to 70° C. with an oil bath and stirred at the temperature for one hour. An ester adapter was attached to the reactor, which was heated to an internal temperature of 98° C. whereby the methanol by-product was removed. There was obtained 152 grams of an aqueous binder composition which had a nonvolatile content of 29.2% when heated at 105° C. for 3 hours.

Synthesis Example 5

A 200-ml reactor equipped with a stirrer, thermometer and condenser was charged with 120 grams (6.67 mol) of water. With stirring at room temperature, a mixture of 44.4 grams (0.2 mol) of $H_2NCH_2CH_2HNCH_2CH_2CH_2Si(OCH_3)_3$ and 13.6 grams (0.1 mol) of $CH_3Si(OCH_3)_3$ was added dropwise over 10 minutes whereupon the internal temperature rose from 26° C. to 44° C. The reaction solution was further heated at 60 to 70° C. with an oil bath and stirred at the temperature for one hour. An ester adapter was attached to the reactor, which was heated to an internal temperature of 98° C. whereby the methanol by-product was removed. There was obtained 153 grams of an aqueous binder composition which had a nonvolatile content of 25.0% when heated at 105° C. for 3 hours.

Synthesis Example 6

A 200-ml reactor equipped with a stirrer, thermometer and condenser was charged with 100 grams (0.45 mol) of $H_2NCH_2CH_2HNCH_2CH_2CH_2Si(OCH_3)_3$ and 34.2 grams (0.23 mol) of $Si(OCH_3)_4$. With stirring at room temperature, 50.4 grams (2.8 mol) of water was added dropwise whereupon the internal temperature rose from 23° C. to 73° C. The reaction solution was further stirred at the temperature for one hour. There was obtained 181 grams of an aqueous binder composition which had a nonvolatile content of 45.7% when heated at 105° C. for 3 hours.

Synthesis Example 7

A 200-ml reactor equipped with a stirrer, thermometer and condenser was charged with 120 grams (6.67 mol) of water. With stirring at room temperature, 44.4 grams (0.2 mol) of $H_2NCH_2CH_2HNCH_2CH_2CH_2Si(OCH_3)_3$ was added dropwise over 10 minutes whereupon the internal temperature rose from 25° C. to 54° C. Stirring was continued for a further 30 minutes and 15.2 grams (0.1 mol) of $Si(OCH_3)_4$ was added dropwise. After the completion of addition, the reaction solution was heated at 60 to 70° C. with an oil bath and stirred at the temperature for one hour. An ester adapter was attached to the reactor, which was heated to an internal temperature of 98° C. whereby the methanol by-product was removed. There was obtained 136 grams of an aqueous binder composition which had a nonvolatile content of 27.7% when heated at 105° C. for 3 hours.

Synthesis Example 8

A 200-ml reactor equipped with a stirrer, thermometer and condenser was charged with 120 grams (6.67 mol) of water. With stirring at room temperature, 66.6 grams (0.3 mol) of $H_2NCH_2CH_2HNCH_2CH_2CH_2Si(OCH_3)_3$ was added dropwise over 10 minutes whereupon the internal temperature rose from 27° C. to 50° C. The reaction solution was further heated at 60 to 70° C. with an oil bath and stirred at the temperature for one hour. An ester adapter was attached to the reactor, which was heated to an internal temperature of 98° C. whereby the methanol by-product was removed. There was obtained 155.2 grams of an aqueous binder composition which had a nonvolatile content of 30.4% when heated at 105° C. for 3 hours.

Synthesis Example 9

A 200-ml reactor equipped with a stirrer, thermometer and condenser was charged with 100 grams (0.45 mol) of $H_2NCH_2CH_2HNCH_2CH_2CH_2Si(OCH_3)_3$. With stirring at room temperature, 12.2 grams (0.68 mol) of water was added dropwise over 8 minutes whereupon the internal temperature rose from 22° C. to 71° C. The reaction solution was further stirred at the temperature for one hour. There was obtained a solution of an organic silicon compound which had a nonvolatile content of 56.6% when heated at 105° C. for 3 hours. This solution thickened and gelled in 3 months.

Examples 1–7

By diluting the binder compositions obtained in Synthesis Examples 1 to 7 with water, there were prepared coating compositions containing the organic silicon compound component in a concentration of 5%, 10% and 20% by weight. The coating compositions were observed for stability at room temperature. All the compositions were found stable.

The coating compositions were applied to sheets of paper and dried in air at room temperature. The coatings were examined for water resistance, heat resistance and weatherability. For testing purposes, dyes Chlorazole Black and Acid Yellow 23 (manufactured by Tokyo Chemicals K.K.) each were added to the coating compositions in a concentration of 4% (with the coating compositions kept at pH 9.3 and pH 8.0, respectively). Water resistance was examined by dropping a water droplet onto the coating and observing whether the underlying paper was contaminated as by oozing. Heat resistance was examined by keeping the coated paper in a dryer at 150° C. for 10 minutes and observing discoloration and fading. Weatherability was examined by placing the coated paper in a polyethylene bag, exposing it to sunlight for one month as an outdoor test, and observing discoloration and fading. The test results of the Chlorazole Black added samples are shown in Table 1 and the test results of the Acid Yellow 23 added samples are shown in Table 2.

Comparative Examples 1–3

Using an aqueous dye solution free of a binder and the organic silicon compound components obtained in Synthesis Examples 8 and 9, the same procedure as in Examples was carried out. The test results of the Chlorazole Black and Acid Yellow 23 added samples are shown in Tables 1 and 2, respectively. It is noted that the composition of Comparative Example 3 was stable for only one month whereas the composition of Comparative Example 2 was stable.

TABLE 1

| | Binder composition | Concentration (wt %) | Water resistance | Heat resistance | Weatherability |
|---|---|---|---|---|---|
| Example | | | | | |
| 1 | SE1 | 5 | ○ | ○ | ○ |
| | | 10 | ○ | ○ | ○ |
| | | 20 | ○ | ○ | ○ |
| 2 | SE2 | 5 | ○ | ○ | Δ |
| | | 10 | ○ | ○ | ○ |
| | | 20 | ○ | ○ | ○ |
| 3 | SE3 | 5 | ○ | ○ | ○ |
| | | 10 | ○ | ○ | ○ |
| | | 20 | ○ | ○ | ○ |
| 4 | SE4 | 5 | Δ | Δ–○ | Δ–○ |
| | | 10 | ○ | ○ | ○ |
| | | 20 | ○ | ○ | ○ |
| 5 | SE5 | 5 | Δ–○ | Δ–○ | Δ |
| | | 10 | ○ | ○ | ○ |
| | | 20 | ○ | ○ | ○ |
| 6 | SE6 | 5 | Δ | Δ–○ | Δ–○ |
| | | 10 | ○ | ○ | ○ |
| | | 20 | ○ | ○ | ○ |
| 7 | SE7 | 5 | ○ | Δ–○ | Δ |
| | | 10 | ○ | ○ | ○ |
| | | 20 | ○ | ○ | ○ |
| Comparative Example | | | | | |
| 1 | — | — | X | X | X |
| 2 | SE8 | 5 | X–Δ | X–Δ | X–Δ |
| | | 10 | Δ | X–Δ | Δ |
| | | 20 | Δ | X–Δ | Δ |
| 3 | SE9 | 5 | X | X | X–Δ |
| | | 10 | X–Δ | Δ | Δ |
| | | 20 | Δ | Δ | Δ |

○: not discolored/faded and not stained
Δ: somewhat discolored/faded and not stained
X: discolored/faded and stained

TABLE 2

| | Binder composition | Concentration (wt %) | Water resistance | Heat resistance | Weatherability |
|---|---|---|---|---|---|
| Example | | | | | |
| 1 | SE1 | 5 | ○ | ○ | ○ |
| | | 10 | ○ | ○ | ○ |
| | | 20 | ○ | ○ | ○ |
| 2 | SE2 | 5 | ○ | ○ | ○ |
| | | 10 | ○ | ○ | ○ |
| | | 20 | ○ | ○ | ○ |
| 3 | SE3 | 5 | ○ | ○ | Δ |
| | | 10 | ○ | ○ | ○ |
| | | 20 | ○ | ○ | ○ |
| 4 | SE4 | 5 | Δ | ○ | Δ |
| | | 10 | ○ | ○ | ○ |
| | | 20 | ○ | ○ | ○ |
| 5 | SE5 | 5 | ○ | ○ | Δ |
| | | 10 | ○ | ○ | ○ |
| | | 20 | ○ | ○ | ○ |
| 6 | SE6 | 5 | Δ | Δ–○ | Δ–○ |
| | | 10 | ○ | ○ | ○ |
| | | 20 | ○ | ○ | ○ |
| 7 | SE7 | 5 | ○ | Δ–○ | Δ |
| | | 10 | ○ | ○ | ○ |
| | | 20 | ○ | ○ | ○ |
| Comparative Example | | | | | |
| 1 | — | — | X | X | X |
| 2 | SE8 | 5 | X–Δ | X–Δ | X–Δ |
| | | 10 | Δ | X–Δ | Δ |
| | | 20 | Δ | Δ | Δ |
| 3 | SE9 | 5 | X | X | X |
| | | 10 | Δ | X | X–Δ |
| | | 20 | Δ | Δ | Δ |

Reference Example 1

A 500-reactor equipped with a stirrer, thermometer and condenser was charged with 15 grams of acrylic acid, 20 grams or methyl methacrylate, 15 grams of 2-(2'-hydroxy-5'-thylphenyl)-2H-benzotriazole (Otsuka Chemical K.K., trade name RUNA-93), and 100 grams of acetone. They were mixed in a nitrogen atmosphere. To the mixture was added 0.5 gram of 2,2'-azobisisobutyronitrile. Reaction was conducted under acetone reflux for 10 hours, synthesizing an acrylic copolymer having an acid value of 230 KOH mg/g. To the reaction solution, 75 grams of 5% ammonia water was slowly added. Then 100 grams of water was added to the reaction solution, from which the acetone was distilled off at a temperature of 60° C. under vacuum. There was obtained 220 grams of a pale yellow clear solution of a UV absorbing group-containing acrylic copolymer (nonvolatile content 23%).

Reference Example 2

A 500-ml reactor equipped with a stirrer, thermometer and condenser was charged with 15 grams of methacrylic acid, 27.5 grams of butyl acrylate, 7.5 grams of 2-(2'-hydroxy-5'-methacryloxyethylphenyl)-2H-benzotriazole (Otsuka Chemical K.K., trade name RUNA-93), and 100 grams of isopropyl alcohol. They were mixed in a nitrogen atmosphere. To the mixture was added 0.5 gram of 2,2'-azobisisobutyronitrile. Reaction was conducted under isopropyl alcohol reflux for 10 hours, synthesizing an acrylic copolymer having an acid value of 190 KOH mg/g. To the reaction solution, 18 grams of triethylamine was slowly added. Then 180 grams of water was added to the reaction solution, from which the isopropyl alcohol was distilled off at a temperature of 60° C. under vacuum. There was obtained 235 grams of a pale yellow clear solution of a UV absorbing group-containing acrylic copolymer (nonvolatile content 20%).

Examples 8–22 & Comparative Examples 4–10

Coating solutions as shown in Table 3 were prepared by blending a water-soluble organic silicon compound and a water-soluble or dispersible UV absorbing compound. The organic silicon compounds used were the products of Synthesis Examples 1, 3, and 5 (designated SE1, SE3, and SE5). The UV absorbing compounds used were sodium 2-hydroxy-4-methoxybenzophenone-5-sulfonate (Shonan Chemical, ASL-24S), titanium oxide sol (10% aqueous solution), cerium oxide sol (10% aqueous solution), and the acrylic copolymers of Reference Examples 1 and 2 (designated RE1 and RE2).

TABLE 3

| | Composition (pbw) | | | | | | | | |
|---|---|---|---|---|---|---|---|---|---|
| | Water-soluble organic silicon compound | | | Water-soluble or dispersible UV absorbing compound | | | | | |
| | SE1 | SE3 | SE5 | ASL-24S | TiO$_2$ | CeO$_2$ | RE1 | RE2 | Water |
| E8 | 100 | — | — | 200 | — | — | — | — | 1000 |
| E9 | 100 | — | — | — | 100 | — | — | — | 1000 |
| E10 | 100 | — | — | — | — | 100 | — | — | 1000 |
| E11 | 100 | — | — | — | — | — | 200 | — | 1000 |
| E12 | 100 | — | — | — | — | — | — | 200 | 1000 |
| E13 | — | 100 | — | 100 | — | — | — | — | 500 |
| E14 | — | 100 | — | — | 50 | — | — | — | 500 |
| E15 | — | 100 | — | — | — | 10 | — | — | 500 |
| E16 | — | 100 | — | — | — | — | 50 | — | 500 |
| E17 | — | 100 | — | — | — | — | — | 10 | 500 |
| E18 | — | — | 100 | 300 | — | — | — | — | 1500 |
| E19 | — | — | 100 | — | 300 | — | — | — | 1500 |
| E20 | — | — | 100 | — | — | 300 | — | — | 1500 |
| E21 | — | — | 100 | — | — | — | 100 | — | 1500 |
| E22 | — | — | 100 | — | — | — | — | 100 | 1500 |
| CE4 | — | — | — | — | — | — | — | — | 1000 |
| CE5 | — | — | — | 100 | — | — | — | — | 1000 |
| CE6 | — | — | — | — | 100 | — | — | — | 1000 |
| CE7 | — | — | — | — | — | — | 100 | — | 1000 |
| CE8 | 100 | — | — | — | — | — | — | — | 1000 |
| CE9 | — | 100 | — | — | — | — | — | — | 1000 |
| CE10 | — | — | 100 | — | — | — | — | — | 1000 |

Note that in Comparative Example 4 (CE4), no coating solution was applied and that the amounts of the compounds of SE1, SE3, and SE5 and the polymers of RE1 and RE2 are calculated as solids.

There were prepared aqueous solutions containing 4% by weight of dyes Chlorazole Black and Acid Yellow 23 (manufactured by Tokyo Chemicals K.K.), respectively. The dye solution was brush coated to a sheet of paper and dried at room temperature. The coating solution shown in Table 3 was applied to the paper surface and dried at room temperature. The coated paper was examined for water resistance, heat resistance and weatherability. Water resistance was examined by dropping a water droplet onto the coating and observing the oozing of the underlying paper. Heat resistance was examined by keeping the coated paper in a dryer at 150° C. and observing discoloration and fading. Weatherability was examined by placing the coated paper in a polyethylene bag, exposing it to sunlight for one month as an outdoor test, and observing discoloration and fading. The sample was rated on a three-point scale in terms of a color change and a degree thereof in comparison with a blank, that is, rated "O" for no change of color, "A" for some discoloration/fading, and "X" for serious discoloration/fading and undiscriminatable color. The test results are shown in Table 4.

TABLE 4

| | Chlorazole Black | | | Acid Yellow 23 | | |
|---|---|---|---|---|---|---|
| | Water resistance | Heat resistance | Weatherability | Water resistance | Heat resistance | Weatherability |
| E8 | O | O | O | O | O | O |
| E9 | O | O | O | O | O | O |
| E10 | O | O | O | O | O | O |
| E11 | O | O | O | O | O | O |
| E12 | O | O | O | O | O | O |
| E13 | O | O | O | O | O | O |
| E14 | O | O | O | O | O | O |
| E15 | O | O | O-Δ | O | O | O-Δ |
| E16 | O | O | O | O | O | O |
| E17 | O | O | O-Δ | O | O | O-Δ |
| E18 | O-Δ | O | O | O-Δ | O | O |
| E19 | O-Δ | O | O | O-Δ | O | O |
| E20 | O-Δ | O | O | O-Δ | O | O |
| E21 | O | O | O | O | O | O |
| E22 | O | O | O | O | O | O |
| CE4 | X | Δ | X | X | X | X |
| CE5 | X | Δ | O | X | X | O |
| CE6 | X | Δ | O | X | X | O |
| CE7 | Δ | Δ | O | Δ | X | O |
| CE8 | O | O | X | O | O | X |
| CE9 | O | O | X | O | O | X |
| CE10 | O | O | X | O | O | x |

There have been described a binder composition comprising a specific organic silicon compound in water and an aqueous coating composition containing the same as a binder component, which are shelf stable, remain stable even in alkaline conditions, and impart water resistance, heat resistance and weatherability to various substrates. Japanese Patent Application No. 207871/1996 is incorporated herein by reference.

While the invention has been described in what is presently considered to be a preferred embodiment, other variations and modifications will become apparent to those skilled in the art. It is intended, therefore, that the invention not be limited to the illustrative embodiments, but be interpreted Within the full spirit and scope of the appended claims.

What is claimed is:

1. A binder composition comprising an organic silicon compound dissolved in a solvent which is mainly water, wherein the solvent is provided in an amount of 400 to 5,000 parts by weight per 100 parts by weight of the organic silicon compound
    said organic silicon compound being obtained by hydrolyzing (A) 100 parts by weight of a nitrogenous organic group-containing hydrolyzable silane selected from the group consisting of
        $H_2NCH_2CH_2HNCH_2CH_2CH_2Si(OCH_3)_3$,
        $H_2NCH_2CH_2HNCH_2CH_2CH_2Si(OCH_2CH_3)_3$,
        $H_2NCH_2CH_2HNCH_2CH_2HNCH_2CH_2CH_2Si(OCH_3)_3$, and
        $H_2NCH_2CH_2HNCH_2CH_2HNCH_2CH_2 Si(OCH_2CH_3)_3$, or a partial hydrolyzate thereof, and (B) 5 to 200 parts by weight of a hydrolyzable silane represented by the following formula (2) or a partial hydrolyzate thereof:
        wherein $R^4$ is an alkoxy or acyloxy group having 1 to 4 carbon atoms, said binder composition being stable in an alkaline region.
2. A binder composition according to claim 1 wherein said hydrolyzable silane (B) is $Si(OCH_3)_4$ or $Si(OCH_2CH_3)_4$.
3. The binder composition of claim 1, wherein the hydrolyzable silane of the formula (2) or partial hydrolyzate thereof is used in an amount of 10 to 150 parts by weight per 100 parts by weight of the nitrogenous organic group-containing hydrolyzable silane or partial hydrolyzate thereof.

4. The binder composition of claim 1, wherein the solvent is provided in an amount of 1000 to 3000 parts by weight per 100 parts by weight of the organic silicon compound.

5. The binder composition of claim 1, wherein the molar ratio of water in the solvent to the organic silicon compound is from 5/1 to 50/1.

6. The binder composition of claim 1, wherein the organic silicon compound is obtained by adding dropwise a mixture of the nitrogenous organic group-containing hydrolyzable silane or partial hydrolyzate thereof and the hydrolyzable silane of the formula (2) or partial hydrolyzate thereof to the solvent which is mainly water.

7. An aqueous coating composition comprising the binder composition of claim 1 as a binder component.

8. An aqueous coating composition according to claim 7 further comprising a water-dispersible or soluble compound having a ultraviolet absorbing function.

9. An aqueous coating composition according to claim 8 wherein the compound having a ultraviolet absorbing function is a water-dispersible or water-soluble organic absorbing agent.

10. An aqueous coating composition according to claim 8 wherein the compound having a ultraviolet absorbing function is a microparticulate inorganic compound containing titanium, cerium or zinc.

11. An aqueous coating composition according to claim 8 wherein the compound having a ultraviolet absorbing function is an acrylic copolymer containing a ultraviolet absorbing group.

12. The aqueous coating of claim 8 wherein the compound having an ultraviolet absorbing function is an alkali metal salt of 2-hydroxy-4-methoxybenzophenone-5-sulfonic acid.

13. The aqueous coating of claim 8, wherein the compound having an ultraviolet absorbing function is provided in an amount of 10 to 300 parts by weight per 100 parts by weight of the organic silicon compound.

14. The aqueous coating composition of claim 7, wherein the coating composition contains 100 to 5000 parts by weight of water per 100 parts by weight of the organic silicon compound.

15. An article having a coating of the aqueous coating composition of claim 7 formed on its surface.

* * * * *